United States Patent
Rembe et al.

(10) Patent No.: US 9,851,243 B2
(45) Date of Patent: Dec. 26, 2017

(54) METHOD AND DEVICE FOR THE OPTICAL NON-CONTACT OSCILLATION MEASUREMENT OF AN OSCILLATING OBJECT

(75) Inventors: Christian Rembe, Waldbronn (DE); Alexander Drabenstedt, Ettlingen (DE); Matthias Schussler, Waldbronn (DE); Christian Ehrmann, Karlsruhe (DE); Volkmar Roth, Karlsruhe (DE)

(73) Assignee: POLYTEC GMBH, Waldbronn (DE)

( * ) Notice: Subject to any disclaimer, the term of this patent is extended or adjusted under 35 U.S.C. 154(b) by 499 days.

(21) Appl. No.: 14/112,750

(22) PCT Filed: Mar. 16, 2012

(86) PCT No.: PCT/EP2012/054699
§ 371 (c)(1),
(2), (4) Date: Oct. 18, 2013

(87) PCT Pub. No.: WO2012/150079
PCT Pub. Date: Nov. 8, 2012

(65) Prior Publication Data
US 2014/0041456 A1    Feb. 13, 2014

(30) Foreign Application Priority Data
May 3, 2011    (DE) .................. 10 2011 100 252

(51) Int. Cl.
*G01H 9/00*     (2006.01)

(52) U.S. Cl.
CPC .................. *G01H 9/00* (2013.01)

(58) Field of Classification Search
CPC .................................................. G01H 9/00
USPC ........................................................ 73/655
See application file for complete search history.

(56) References Cited

U.S. PATENT DOCUMENTS

| | | | | |
|---|---|---|---|---|
| 4,812,035 A | * | 3/1989 | Freedman | G01S 17/325 342/122 |
| 7,193,720 B2 | * | 3/2007 | Gatt | G01H 9/002 356/489 |
| 8,599,649 B1 | * | 12/2013 | Antonelli | G01H 9/00 367/149 |

(Continued)

FOREIGN PATENT DOCUMENTS

JP     2218189     8/1990

*Primary Examiner* — Lisa Caputo
*Assistant Examiner* — Tarun Sinha
(74) *Attorney, Agent, or Firm* — Volpe & Koenig, P.C.

(57) ABSTRACT

A device for the optical non-contact vibration measurement of an vibrating object, including a laser Doppler vibrometer that has a laser as the light source for a laser beam, a first beam splitter assembly for splitting the laser beam into a measuring beam and a reference beam, a means for shifting the frequency of the reference beam or of the measuring beam in a defined manner, a second beam splitter assembly by which the measuring beam back-scattered by the oscillating object is merged with the reference beam and superimposed on the same, and a detector for receiving the superimposed measuring and reference beam and for generating a measurement signal. The laser is provided with a polarization filter arranged inside the optical resonator of the laser and the laser is frequency stabilized by regulating to a beat signal of the laser.

12 Claims, 2 Drawing Sheets

(56) References Cited

U.S. PATENT DOCUMENTS

| | | | |
|---|---|---|---|
| 2003/0146766 A1* | 8/2003 | Liu | G11B 5/59627 |
| | | | 324/545 |
| 2005/0237533 A1 | 10/2005 | Lal et al. | |
| 2008/0015662 A1* | 1/2008 | Tunnermann | A61F 9/008 |
| | | | 607/89 |
| 2009/0073544 A1* | 3/2009 | Schweitzer | G02F 1/11 |
| | | | 359/305 |
| 2009/0134310 A1* | 5/2009 | Goodno | H01S 3/2308 |
| | | | 250/201.9 |
| 2010/0097614 A1* | 4/2010 | Kourogi | A61B 5/0066 |
| | | | 356/477 |

* cited by examiner

METHOD AND DEVICE FOR THE OPTICAL NON-CONTACT OSCILLATION MEASUREMENT OF AN OSCILLATING OBJECT

BACKGROUND

The invention relates to a device and method for optical, contactless vibration measurement of a vibrating object.

Such a method utilizes and such a device comprises a laser Doppler vibrometer with a laser as light source for a laser beam. This laser beam is split into a measurement beam and a reference beam in a first beam splitter arrangement. Either the measurement beam or the reference beam experiences a frequency shift, for which an acousto-optic modulator, in particular a Bragg cell, is usually used. The measurement beam is directed to an object to be measured and scattered back or reflected from there. A second beam splitter arrangement combines the measurement beam scattered back from the vibrating object with the reference beam and superposes the two beams, resulting in an interference signal. The superposed measurement and reference beams are fed to a detector, which generates an electric measurement signal from the interference signal.

Laser Doppler vibrometers are able to perform contactless measurements up to the megahertz range of vibrations of objects, in particular of object surfaces. This opens up applications when measuring vibrations of very small and light structures, such as in micro-systems technology. However, it is also possible to measure vibrations in the air and in fluids with the aid of a laser Doppler vibrometer. Here, the frequency of the measurement beam is modulated by the movement of the object surface to be measured as a result of the Doppler Effect during reflection. Since the laser emits coherent light, an interference signal emerges from the superposition of the measurement beam, which is frequency modulated by the object movement, and the reference beam, which remains unchanged, from which interference signal it is possible to derive the speed of the object. Hence the vibration speed of the surface of the object to be measured is acquired.

Since one of the two parts of the laser beam is frequency shifted in the presently utilized laser Doppler vibrometer and hence a heterodyne vibrometer is present, a modulation frequency of the interference signal is generated which renders it possible to determine not only the current speed of the surface of the object to be measured, but also the sign, i.e. the movement direction, and so the vibration movement of the object to be measured can be acquired uniquely using the heterodyne laser Doppler vibrometer.

The shift in frequency of the reference or measurement beam, which, as mentioned above, is typically achieved by an acousto-optic modulator (Bragg cell), is only a fraction of the frequency of the laser light. Use is typically made of a helium-neon laser (He—Ne), the frequency of which lies at $4.74 \times 10^{14}$ Hz. The shift in frequency of the reference or measurement beam is typically merely 40 MHz. However, thermal influences on the laser, and there in particular on the optical resonator thereof, lead to changes in the resonator length which could change the frequency of the laser beam by a multiple of the frequency shift caused by the Bragg cell. In the case of a helium-neon laser, an increase in temperature by only 0.1° C. typically leads to a shift in frequency of the laser beam by 300 MHz.

This causes particular problems if use is made of several laser Doppler vibrometers, which simultaneously direct the measurement beams thereof to a region of a vibrating object to be measured, for example in order to be able to establish three-dimensional vibrations. This is because if the frequencies of the measurement beams are too close, a crosstalk effect can occur here, i.e. the backscattered measurement beam from one vibrometer which at the same time reaches another vibrometer can falsify the measurement there or render it impossible to take a measurement. Since the center frequency of each He—Ne laser is determined by a well-defined atomic electron level, the center frequencies of a number of lasers do not differ. If the frequencies of the measurement beams of several such vibrometers are shifted due to thermal effects, such crosstalk effects occur randomly again and again.

In order to meet the aforementioned problems, it is known to stabilize the frequency of the laser employed in the laser Doppler vibrometer. Here, this laser is provided with a control loop, which, in particular, acts on the length of the optical resonator in order to compensate for temperature-induced changes in length and/or frequency shifts. At the same time, it is ensured that the laser only emits one active mode which is used for the measurement. A known frequency stabilization consists in using an unpolarized laser without a preferred polarization direction and with two active modes, taking one of the two modes by means of a polarization beam splitter and using this mode as a controlled variable.

However, such a frequency stabilized laser is disadvantageous in that it reacts very sensitively to unwanted reflections and other stray light reaching the optical resonator. Moreover, the maximum laser power of such a frequency stabilized laser is not available for carrying out a measurement. This is particularly very disadvantageous if a measurement device of the type in question should make full use of the emitted light power permitted by the selected laser class in order to achieve maximum measurement accuracy.

The aforementioned disadvantage of reduced power of a frequency stabilized laser can be avoided if a laser is employed in a device and a method of the type in question, in which the active modes are all used for the measurement. This is preferably brought about by virtue of a polarization filter being employed within the optical resonator of the laser, which polarization filter brings all active modes of the laser to the same polarization such that, firstly, the full laser power is available for the measurement and, secondly, the laser becomes very much less sensitive against back reflection and stray light as a result of the polarization filter. However, according to current knowledge, frequency stabilization of this laser is then ruled out.

Without frequency stabilization, the problems which were described at the outset, in particular in the context of using several laser Doppler vibrometers, in turn emerge. But even in the case of a vibration measurement using only one laser Doppler vibrometer, the laser of which emits more than one active mode, it is possible for the signal strength of the interference signal to collapse at certain values of a temperature induced frequency shift such that a measurement is no longer possible. This is the case, in particular, if two active modes are emitted which have approximately equal amplitudes and which interfere destructively. Vibration measurements can fail in this manner, namely if, for example, temperature influences from the surroundings lead to the laser reaching a mode state in which a measurement is not possible.

Proceeding from this prior art, the present invention is based on the object of providing a device and a method of the type mentioned at the outset, by means of which a laser of a laser Doppler vibrometer is stabilized in respect of its frequency, in particular for avoiding crosstalk effects in the case of measurements with two or more laser Doppler vibrometers, and the laser Doppler vibrometer can nevertheless be operated with almost maximum signal strength.

SUMMARY

This object is achieved by a device and method with one or more of the features of the invention. Preferred embodiments of the device and method according to the invention are discussed below and in the claims.

Thus, the method according to the invention and the device according to the invention are distinguished by virtue of the fact that the laser from the laser Doppler vibrometer is provided with a polarization filter arranged within the optical resonator thereof, which applies the same polarization to the various modes of the laser. At least one Brewster window is preferably used here as polarization filter. As a result of this polarization filter, several, usually two, modes of the laser are brought into the same polarization such that, on one hand, a mode can no longer be masked by means of a polarization beam splitter and used as manipulated variable for regulating the laser, and, on the other hand, substantially the full laser power is however available for the measurement. Nevertheless, the laser is frequency stabilized according to the invention, i.e. it is provided with an appropriate control loop.

This is because, according to the invention, it was identified for the first time that it is not necessary to use a mono-mode laser for the frequency stabilization of the laser in the laser Doppler vibrometer, but rather that using two or more active modes simultaneously for the measurement is harmless. All that is important is that one active mode is significantly stronger than the others and that the frequency of this dominant mode can be regulated to a defined value.

If the laser operates in two mode operation or in three or more mode operation, with the polarization directions of all modes being substantially equal, a beat frequency between two adjacent modes emerges. According to the invention, it was identified that acquiring this beat frequency enables regulation of the resonator length of the laser for frequency stabilization purposes. This is because a change in laser temperature brings about, firstly, a frequency shift and, secondly, a change in the amplitude distribution of the various active modes. In the case of a temperature change in the laser, the active modes thereof wander through the amplification profile of the laser, and so the active modes with one exception in each case have different intensities during the sweep. This leads to a quasi-periodic profile of the beat signal when sweeping through the active modes through the amplification profile, depending on the resonator length of the laser, which is generally linearly dependent on the temperature of the resonator.

According to the invention, it was identified further that this quasi-periodic profile of the beat signal is suitable for use as control variable for regulating the resonator length of the laser and hence for regulating the laser frequency. Particularly when the resonator length of the laser is regulated by temperature, i.e. by heating and/or cooling when required, the direct relationship, determined according to the invention, between the variations in the intensity of the beat signal and the temperature of the optical resonator can be employed for regulation purposes, to be precise expediently at a point at which the intensity of the beat signal over temperature has a sufficiently steep flank. During a mode sweep through the amplification profile of the laser, this is the case in at least two regions.

According to the invention, the evaluation of the beat signal, which is acquired as electric beat signal, is employed for stabilizing the laser frequency. If use is made of the power or the frequency or a combined measurement variable of power and frequency of the electric beat signal for regulating or stabilizing the laser frequency, a defined power ratio is obtained in the laser modes, which cause the beat signal. Within the scope of the invention, this power ratio can optionally also be zero, to be precise when the laser happens to run with one mode.

Thus, a multi-mode laser can be used with the present invention and the former can nevertheless be frequency stabilized, to be precise, in particular, at a frequency at which two or more active modes have different intensities such that the regulation remains in a stable operating state. Random temperature changes during operation as a result of heating effects and environmental influences are compensated for by the frequency regulation according to the invention such that the device according to the invention can measure vibrations in an automated manner over long periods of time without running the risk of reaching a state during the measurement in which the signal-to-noise ratio is too inexpedient for a reliable measurement result.

Particularly in the case of a vibration measurement of an object by means of several laser Doppler vibrometers there can no longer be random crosstalk effects, even in the case of relatively long-duration automatic measurement processes, because, for example, the employed lasers are subject to different temperature changes and hence frequency shifts in relation to one another due to environmental influences and heating effects. Nevertheless, the lasers of the vibrometers can be operated such that two modes of equal strength are not created since this would lead to a collapse in the signal strength.

Moreover, the lasers designed according to the invention are very insensitive to unwanted reflections and other stray light reaching the resonator due to the employed polarization filter.

Finally, the use according to the invention of frequency stabilized lasers with polarization filters can preferably be employed to operate a measurement device with several laser Doppler vibrometers which are, within the scope of the focusing accuracy, simultaneously directed to the same point of the vibrating object such that crosstalk effects are avoided. To this end, the frequency regulation of the laser, present according to the invention, can be employed for a targeted frequency shift of one or more lasers of the employed laser Doppler vibrometer, as required, in order to be able to maintain frequency spacings at which there is no or only little crosstalk effect at specific demodulation bandwidths and, at the same time, the enforced signal collapse does not become too great. To this end, the laser frequencies are regulated such that the frequencies lie apart by at least 2× the demodulation bandwidth.

BRIEF DESCRIPTION OF THE DRAWINGS

An exemplary embodiment of the present invention will be described and explained in more detail below on the basis of the attached drawings. In detail.

DETAILED DESCRIPTION OF THE PREFERRED EMBODIMENTS

Figure 1A:
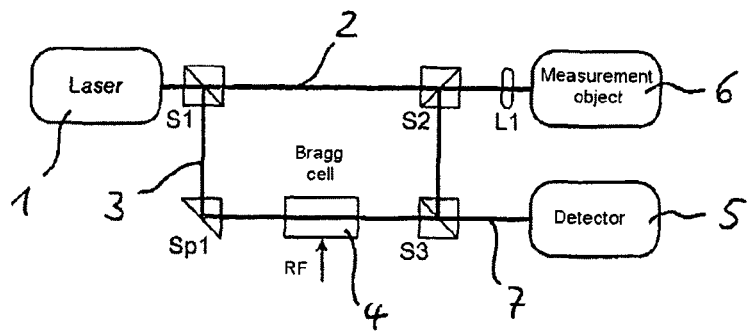
FIG. 1 shows two alternative block diagrams (FIGS. 1a and 1b) of a heterodyne laser Doppler vibrometer for use in a device according to the invention.

Here, a device with a laser Doppler vibrometer, which in principle has a design as depicted in FIG. 1a, is described as exemplary embodiment for a device according to the invention. In the present exemplary embodiment, use is made of a helium-neon laser 1 with a resonator length of 20.4 cm, the coherent light of which is split by a first beam splitter S1 into a measurement beam 2 and a reference beam 3. The reference beam 3 is routed over a mirror Sp1 through a Bragg cell 4, which serves as an acousto-optic frequency shifter in this case, and reaches an optical detector 5 via a further beam splitter S3. Here, the Bragg cell 4 shifts the reference signal 3 in terms of its frequency by a frequency offset of typically 40 MHz.

The measurement beam 2 is routed via a second beam splitter S2 and a lambda/4 plate L1 to a vibrating measurement object 6. The surface of the measurement object 6 scatters the measurement beam 2 back. In the second (polarization) beam splitter S2, the back-scattered measurement beam is reflected onto the third beam splitter S3 and there it is superposed on the reference beam 3. The superposed, time coherent measurement and reference beams form an interference signal 7, the intensity of which is received by the optical detector 5. In another design, the lambda/4 plate L1 can be omitted such that a normal beam splitter can be used as S2.

As a result of the Doppler Effect, the light of the measurement beam 2 reflected at the vibrating measurement object 6 is frequency shifted in accordance with the current speed of the measurement object surface. This frequency shift is directly proportional to the speed of the scanned object surface. Since the measurement beam 2, which is frequency shifted thus, is not superposed on a reference beam 3 that remained unchanged, but rather superposed on the measurement beam 3, which was provided with a frequency offset by means of the Bragg cell 4, it is possible to determine not only the current vibration speed of the measurement object surface from the signal of the detector 5, but also the sign thereof. The vibration movement is therefore established uniquely.

If, for example, three such laser Doppler vibrometers are employed in a device according to the invention, a measurement object 6 or the vibration of the surface thereof can be established in three dimensions.

The laser light of the helium-neon laser, employed in the present exemplary embodiment, with a wavelength of 632.8 nm and a resonator length of 204 mm has a mean laser frequency of 474 THz. This light source is a multimode laser, in which, depending on the laser state, one or at most three active laser modes are formed. Depending on the intensity of the modes and the exact position thereof in the frequency band, the laser light is strongly influenced in terms of its intensity and frequency.

The laser modes (both active and passive) assume a mode spacing $\Delta v$, which is dependent on the resonator length. This fixed mode spacing $\Delta v$ is approximately 735 MHz in the case of the helium-neon laser used in the present exemplary embodiment.

Figure 2:
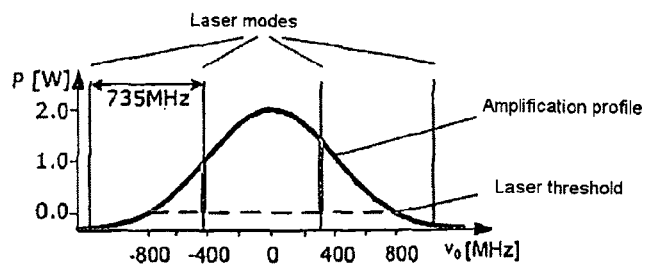
FIG. 2 shows a schematic diagram of the amplification profile of a helium-neon laser, used in an exemplary fashion.

A selection of active modes is undertaken by the amplification profile of the helium-neon laser, as visualized by FIG. 2:

FIG. 2 plots the amplification profile of the helium-neon laser, used in the exemplary embodiment, against frequency. Four laser modes, respectively with a spacing of 735 MHz, can be identified, of which two are situated within the amplification profile and above the laser threshold and are therefore the active modes. These two active modes are non-symmetrical in relation to the amplification profile such that the higher frequency mode is dominant in this case. The two modes outside of the amplification profile are not excited and are referred to as passive modes.

In the case of a temperature change in the laser resonator, the modes "wander" through the amplification profile. In the case of a temperature increase and hence an elongation of the resonator, the modes in the diagram according to FIG. 2 move from right to left and, in the case of a temperature decrease, they move from left to right. A change in temperature brings about firstly a shift in frequency and secondly a change in the amplitude distribution of the active modes. In the case of a continuous temperature change, one active mode in each case disappears on one side of the amplification profile and a new active mode appears on the other side of the amplification profile.

The frequency deviation of the dominant mode from the center frequency of the laser can be several hundred MHz. This is many times more than the frequency offset created in the laser Doppler vibrometer by the Bragg cell.

Figure 3:
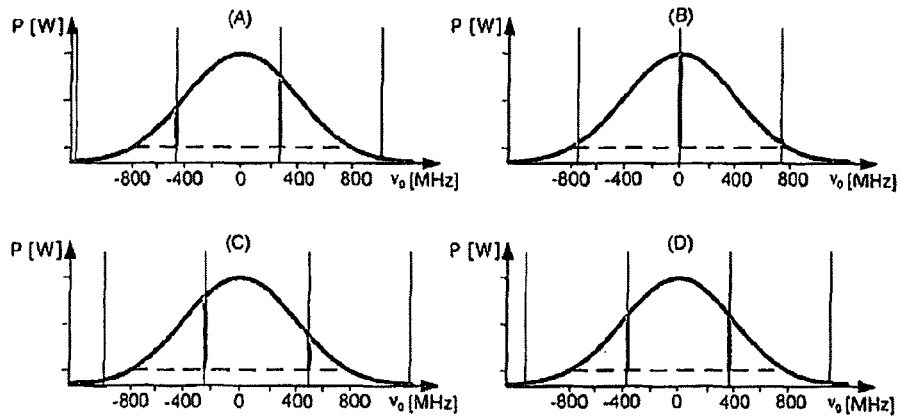
FIG. 3 shows four schematic diagrams like FIG. 2, displaying the operating states of the helium-neon laser at four different temperatures.
Figure 4:
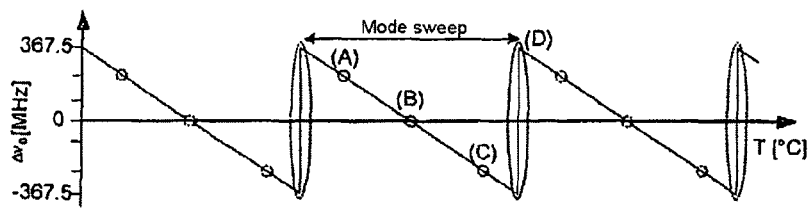
FIG. 4 shows a schematic diagram of the frequency deviation of the dominant mode from the center frequency of the helium-neon laser, depending on the temperature of the resonator; the labels (A), (B), (C), (D) relate to the mode states depicted in FIG. 3.

FIG. 4 shows the frequency deviation of the dominant mode from the center frequency. The frequency jump (D) is created at the point at which two equally strong modes are present; the dominant mode changes at this point. This is visualized in FIGS. 3 and 4, wherein FIG. 3 depicts the amplification profile of the laser and the modes thereof in an illustration corresponding to FIG. 2 in four different operating states (A), (B), (C), (D). The frequency deviation of the dominant mode resulting from these operating states is depicted in FIG. 4, where the operating states (A . . . ) are marked in the frequency curve plotted over temperature. It can clearly be identified that a symmetric three mode operation is present in operating state (B), in which the frequency of the dominant mode corresponds to the center frequency. Cooling of the laser leads to a mode shift in the direction of operating state (A), while heating of the laser causes a mode shift in the direction of operating state (C). The shifts in frequency of the dominant mode resulting therefrom can be read from FIG. 4.

Each mode can be described as sinusoidal vibration with a mode amplitude, a mode frequency and a mode phase. If two or three modes are active simultaneously, two or three sinusoidal vibrations with different frequencies (at the mode spacing) are formed simultaneously in the resonator. By way of example, if the light from the laser is measured by a photodiode, the superposition signal at the difference frequency 735 MHz of the sinusoidal vibrations can be measured. The superposition signal at the difference frequency is referred to as beat signal.

Figure 5:
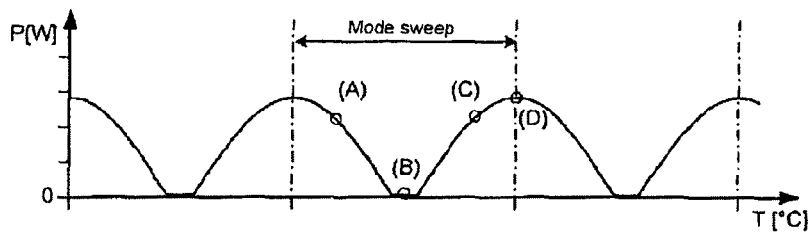
FIG. 5 shows a schematic diagram in which the intensity of the beat signal is plotted against temperature change for the one or two mode operation of the helium-neon laser from FIGS. 2 to 4; the labels (A), (B), (C), (D) relate to the mode states depicted in FIG. 3.

The intensity of the beat signal for the one or two mode operation is plotted in FIG. 5 against the temperature change in the laser resonator. Here, the mode states (A), (B), (C) and (D) from FIG. 3 are plotted too. Two active modes, which form the beat signal by the mixing products thereof, are respectively present at points (A), (C) and (D). The signal collapse at point (B) is due to the fact that only one active mode is present, and so there can be no mixing of the signals and the beat signal equals zero.

Figure 6:
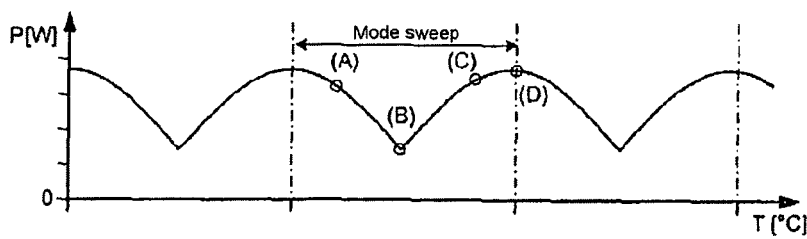
FIG. 6 shows a schematic diagram in which the intensity of the beat signal is plotted against temperature change for the two or three mode operation of the helium-neon laser from FIGS. 2 to 4; the labels (A), (B), (C), (D) relate to the mode states depicted in FIG. 3.

FIG. 6 shows the intensity of the beat signal for two or three active modes, once again plotted against the temperature change in the resonator. Points (A), (C) and (D) correspond to the state of the amplification profile in which two active modes are present. Three active laser modes are simultaneously present where the beat signal collapses, at point (B). The laser therefore always has at least two active modes, which generate a beat signal at 735 MHz; therefore, in contrast to the example from FIG. 5, the beat signal does not disappear completely in this case. However, the beat signal collapse at point (B) is still present.

It becomes clear from FIGS. 5 and 6 that the beat signal has flanks, depending on the temperature, at selected operating states, which are suitable as manipulated variable for regulating the laser frequency. The beat signal can be uniquely associated with the frequency of the dominant mode by the falling and rising flanks.

Figure 1B:
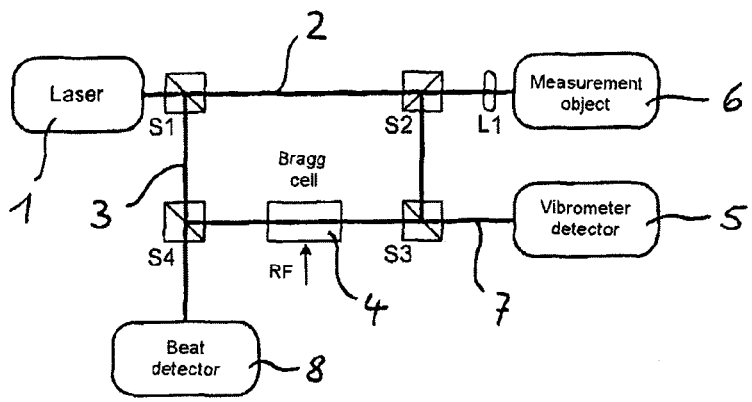

FIG. 1b depicts a design alternative to the one in FIG. 1a of a laser Doppler vibrometer which can be used within the scope of the invention, with, in this case, two detectors being present: a vibrometer detector which corresponds to the optical detector 5 from FIG. 1a but should in this case only detect the interference signal from the vibrometer and a separate beat detector 8 which records the beat signal. For the beat detector, a corresponding signal is decoupled from a fourth beam splitter S4, which is placed into the beam path in place of the mirror Sp1. By contrast, in the design according to FIG. 1a, the optical detector simultaneously detects the interference signal and the beat signal. The embodiment in FIG. 1a assumes that significantly more reference light impinges on the detector than light scattered back from the measurement object so that the beat signal to a good approximation only depends on the reference light; this generally is the case.

For the application in the laser Doppler vibrometer in a device according to the invention or in a method according to the invention, it is advantageous to regulate the laser to a frequency at which one mode is dominant. The regulation of the laser temperature, and hence of the resonator length, can be undertaken by means of a regulated laser heater. The regulation of this laser heater can be brought about by evaluating the beat amplitude and/or the beat frequency of the laser.

As an alternative to a regulated laser heater, use can for example be made of a laser power supply unit with adjustable laser current; the laser current influences the temperature of the resonator.

However, it is also possible to regulate the resonator length in another manner, for example by temperature pads or piezoelectric crystals, which can change the position of the resonator mirrors in a targeted manner.

By means of the present invention it is possible, in particular, to operate devices and methods for optical, contactless vibration measurement with more than one laser Doppler vibrometer for two-dimensional or three-dimensional measuring of an object in an automated fashion over a relatively long period of time, without running the risk that laser frequency shifts occur by means of temperature influences by the surroundings or by positional changes in the laser Doppler vibrometers, which laser frequency shifts can lead to crosstalk effects, as a result of which the measurements would become unusable.

The invention claimed is:

1. A device for optical, contactless vibration measurement of a vibrating object, comprising a laser Doppler vibrometer with a laser as a light source for a laser beam, a first beam splitter arrangement that splits the laser beam into a measurement beam and a reference beam, with a frequency shifting element that provides a defined shift of the frequency of the reference beam or the measurement beam, a second beam splitter arrangement, by which the measurement beam scattered back from the vibrating object is combined with the reference beam and superposed thereon, and a detector that receives the superposed measurement and reference beam and generates a measurement signal, the laser is provided with a polarization filter arranged within an optical resonator thereof and a control loop for frequency stabilization, and the control loop is configured for frequency stabilization of the laser by detecting an amplitude of a beat signal of the laser and providing a feedback adjustment to a target value.

2. The device as claimed in claim 1, wherein the polarization filter is formed by at least one Brewster window.

3. The device as claimed in claim 1, wherein the control loop comprises a beat detector for at least one of establishing the beat signal of the laser or for converting the beat signal into an electric beat signal, and the control loop regulates at least one of a power or a frequency of the electric beat signal.

4. The device as claimed in claim 1, wherein the control loop comprises a heater for targeted modification of a temperature of an optical resonator or for targeted modification of a part of the optical resonator of the laser in order to influence a resonator length.

5. The device as claimed in claim 1, further comprising at least one additional laser Doppler vibrometer, wherein at least two of the laser Doppler vibrometers are simultaneously directed to a region to be measured of the vibrating object, and at least one of the laser Doppler vibrometers is designed such that the frequency of the measurement beam thereof is shiftable in order to counteract a crosstalk effect.

6. A method for optical, contactless vibration measurement of a vibrating object using at least one laser Doppler vibrometer, comprising a laser as a light source for a laser beam, a first beam splitter arrangement for splitting the laser beam into a measurement beam and a reference beam, a frequency shifting element for defined shifting of the frequency of the reference beam or the measurement beam, a second beam splitter arrangement, by which the measurement beam scattered back from the vibrating object is combined with the reference beam and superposed thereon, and a detector for receiving the superposed measurement and reference beam and for generating a measurement signal, providing a same polarization of modes of the laser by a polarization filter arranged within an optical resonator thereof and frequency stabilizing the laser using a control loop for detecting and regulating an amplitude of a beat signal of the laser and providing a feedback adjustment to a target value.

7. The method as claimed in claim 6, wherein the beat signal is at least one of established by a beat detector or converted into an electric beat signal, and the laser is frequency stabilized by regulating at least one of a power or a frequency of the electric beat signal.

8. The method as claimed in claim 6, wherein the laser is frequency stabilized on the basis of beat signal detection, including at least one of an evaluation of a beat signal amplitude, a beat signal frequency or a beat signal change.

9. The method as claimed in claim 6, wherein for frequency stabilization, a temperature of the optical resonator of the laser is modified in a targeted manner in order to influence a resonator length.

10. The method as claimed in claim 9, wherein the temperature of the optical resonator is modified by regulating a laser heater or by a regulated laser power supply unit with adjustable laser current.

11. The method as claimed in claim 6, wherein for frequency stabilization, a distance between mirrors of the optical resonator of the laser is modified by an actuator.

12. The method as claimed in claim 6, wherein at least two of the laser Doppler vibrometers are directed simultaneously to a region to be measured of the vibrating object and a frequency of the measurement beam of at least one of the laser Doppler vibrometers is shifted upon occurrence of a crosstalk effect in order to counteract said crosstalk effect.

* * * * *